United States Patent

Unverzagt et al.

(10) Patent No.: US 6,942,440 B2
(45) Date of Patent: Sep. 13, 2005

(54) QUICK-MOUNTABLE NUT

(75) Inventors: Stefan Unverzagt, Penzing (DE);
Armin Herb, Apfeldorf (DE); Armin Hoffmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/728,257

(22) Filed: Dec. 4, 2003

(65) Prior Publication Data

US 2004/0165965 A1 Aug. 26, 2004

(30) Foreign Application Priority Data

Dec. 5, 2002 (DE) .................................. 102 56 862

(51) Int. Cl.[7] ........................... F16B 39/36; F16B 37/08
(52) U.S. Cl. ..................................... 411/268; 411/433
(58) Field of Search ................. 411/435–436, 246–248, 411/344, 265, 267, 270, 432–433, 437, 266, 530, 527, 352–353

(56) References Cited

U.S. PATENT DOCUMENTS

| 685,927 | A | * | 11/1901 | McNutt | 411/247 |
|---|---|---|---|---|---|
| 1,734,743 | A | * | 11/1929 | Paul | 411/235 |
| 1,764,950 | A | * | 6/1930 | Griner | 24/575.1 |
| 1,944,595 | A | * | 1/1934 | Crowther | 411/270 |
| 2,096,387 | A | * | 10/1937 | Tinnerman | 72/331 |
| 2,156,002 | A | * | 4/1939 | Tinnerman | 411/437 |
| 2,328,587 | A | * | 9/1943 | Simmons | 411/530 |
| 2,342,312 | A | * | 2/1944 | Tinnerman | 411/527 |
| 2,344,423 | A | * | 3/1944 | Simmons | 411/530 |
| 2,397,238 | A | * | 3/1946 | Brose | 411/526 |
| 3,151,652 | A | * | 10/1964 | Zahodiakin | 411/267 |
| 3,157,215 | A | * | 11/1964 | Zahodiakin | 411/267 |
| 3,352,341 | A | * | 11/1967 | Schertz | 411/270 |
| 4,378,187 | A | * | 3/1983 | Fullerton | 411/267 |
| 5,902,085 | A | * | 5/1999 | Yuta | 411/433 |
| 6,062,784 | A | | 5/2000 | Wisser et al. | |
| 6,305,889 | B1 | * | 10/2001 | Blessing et al. | 411/353 |
| 2002/0098057 | A1 | * | 7/2002 | Hoffmann et al. | 411/344 |

FOREIGN PATENT DOCUMENTS

| DE | 4307645 | * | 9/1993 | |
|---|---|---|---|---|
| DE | 4403974 | * | 8/1995 | |
| DE | 19737262 | * | 8/1998 | |
| DE | 19831001 | * | 2/2000 | |
| DE | 19831001 A1 | * | 2/2000 | ........... F16B/37/12 |
| DE | 10052445 | * | 5/2002 | |
| EP | 0084280 | * | 7/1983 | |

* cited by examiner

Primary Examiner—Robert J. Sandy
Assistant Examiner—Jeff Sharp
(74) Attorney, Agent, or Firm—Abelman, Frayne & Schwab

(57) ABSTRACT

A quick-mountable nut, which is capable of at least partially rotation-free axial displacement relative to a threaded bolt (22; 52), includes a nut housing (2; 45), and a springy holding member (4; 49) at least partially located in the nut housing (2; 45) and engaging in at least one screw thread (24; 54) of the threaded bolt (22, 52), with the central through-opening (3; 47) of the nut housing being formed as a tapering radially inward, inner cone (9; 48) for receiving the holding member (4; 49), and with the holding member (4; 49) having two, resiliently movable relative to each other, holding sections (5.1, 5.2; 50.1, 50.2) having each an even wall section abutting a wall of the inner cone (9; 48).

6 Claims, 2 Drawing Sheets

QUICK-MOUNTABLE NUT

BACKGROUND OF THE INVENTION

1. Field of the Invention

The present invention relates to a quick-mountable nut capable of at least partially rotation-free axial displacement relative to a threaded bolt and including a nut housing having a central through-opening and a springy holding member at least partially located in the nut housing and engaging in at least one screw thread of the threaded bolt. The central through-opening is formed as an extending radially inward, inner cone for receiving the holding member.

2. Description of the Prior Art

A nut generally has extending radially inward engagement means which formlockingly engages in the outer screw thread of a bolt. The engagement means of the nut provides only for a single degree of freedom of movement of the nut mounted on the bolt, namely, for a screw movement of the nut along the screw thread. The nut is secured on the bolt due to the static friction between the screw thread and the engagement means of the nut.

Generally, quick-mountable nuts having a wire coil with two springy arms are known. German Publication DE-197 37 262 A1 discloses an attachment device for attaching an object to a facade which is mounted in a C-shaped profile and includes a wire coil with two springy arms which are forcelockingly snapped in elongate undercut openings of a support element and formlockingly engage therein. However, such forcelocking snappable attachment is not suitable for a screw thread with slopping flanks.

EP-0 084 280 A1 discloses a wire nut formed as a wire coil with two springy arms, with the wire coil engaging in the screw thread of a bolt.

U.S. Pat. No. 3,880,041 discloses a fastener formed as a sleeve in the interior of which a helical wire coil is embedded. The wire coil engages in a screw thread.

German Publication DE-43 07 645 A1 discloses a quick-mountable nut the wire coil of which only partially engages in a screw thread, with the quick-mountable nut being positioned by axially acting pressure.

German Publication DE 198 31 001 A1 discloses a quick-mountable nut, which has a helical wire coil located in a nut housing and which is formed as a self-locking fly nut which enables a screw movement-free, axial positioning. The nut becomes located as a result of a screw movement, and it can be unlocked by a release torque acting along the wire coil. Because of only forcelocking engagement of the wire coil in the screw thread, no stable locking of the nut is possible.

For securing tubular conduits in mounting rails, a special rail nut, which has a metric or inch thread and is associated with a mounting rail, is used as a part of an attachment system. The threaded rod is used in this attachment system as a connection member between a pipe bracket and the rail nut. The threaded rod is also used for height adjustment. The threaded rod, which is used as a cut member, is cut to a predetermined length, which results in formation of burrs. Before the rail nut is screwed on the threaded rod, the burrs should be eliminated, e.g., by chamfering. The chamfering process and the height adjustment are very time-consuming processes.

German Publication DE-44 03 974 A1 discloses a quick-mountable nut that can be positioned without being screwed. To this end, the nut is formed of several threaded sectors that formlockingly engage in the thread of a threaded rod. The engagement elements of the quick-mountable nut can be axially resiliently swing out. After a screw movement is effected to secure the nut, the engagement elements, which are secured to a stop, swing in, formlockingly engaging in the thread of the threaded rod.

German Publication DE-100 52 445 A1 discloses a quick-mountable nut having a wire coil with two arms resiliently movable relative to each other. The wire coil is partially located within an opening formed as an inner cone tapering radially inward. The wire coil displacement within the nut housing is such that a perfect engagement of the wire coil with a threaded rod is not possible.

An object the present invention is a quick-mountable nut that formlockingly secures a threaded bolt and insures a reliable connection.

SUMMARY OF THE INVENTION

These and other objects of the present invention, which will be apparent hereinafter, are achieved by providing a quick-mountable nut which is capable of at least partially rotation-free displacement relative to a threaded bolt and which includes a nut housing having a central through-opening, and a springy holding member at least partially located in the hut housing and engaging in at least one screw thread. The central through-opening is formed as a tapering radially inward, inner cone for receiving the holding member. The holding member has two, resiliently movable relative to each other, holding sections having each an even wall section abutting a wall of the inner wall.

The even wall sections of the holding member form essentially an outer cone that abuts the wall of the inner cone or the opening after the nut has been secured. As a result of a screw movement, the holding member is partially axially displaced into the inner cone. The inner cone of the opening restrains the holding member. Thus, with the holding member engaging in the screw thread of the threaded bolt, a threaded formlocking fixing of the quick-mountable nut is effected. The inner cone of the opening insures the fixation of the holding member which has even wall sections which abut the inner surface of the opening (inner cone). This prevents any tilting of the holding member in the opening of the nut housing. In addition, the holding member is resiliently radially expanded until it tightly abuts the inner cone surface, when, e.g., the threaded bolt is extended therethrough.

Preferably, the quick-mountable nut is used for securing a threaded rod on a C-shaped mounting rail. For such use, the base of the quick-mountable nut has a width that is slightly smaller than the opening of the mounting rail, which insures that the nut can be inserted through the opening in the mounting rail. The length of the nut is also somewhat smaller than the inner dimension of the mounting rail. This insures that the quick-mountable nut, which is oriented transverse to the longitudinal axis of the mounting rail, can be formlockingly axially arranged in the mounting rail and can be freely displaced along the mounting rail. The quick-mountable rail can have two axial edges arranged diagonally opposite each other and which are rounded with a diameter corresponding to that of a circle inscribed in the mounting rail. Thereby, the quick-mountable nut, which is inserted along the mounting rail, can be screwed in the mounting rail, e.g., only as a result of a right-hand rotation. Generally, the quick mountable nut, except the above-mentioned axial edges, has a prismatic shape.

An attachment system can be formed also with two quick-mountable nuts, with a first quick-mountable nut, which is formed as a rail nut and which is fixedly connected with a threaded bolt, being inserted in a mounting rail where it engages from behind holding projections provided on the mounting rail. The second quick-mountable nut engages or abuts the end surfaces of free edges of the mounting rail which limit the mounting opening. With a threaded bolt, which is being screwed in, the two quick-mountable nuts become connected. The second quick-mountable nut is formed as a locking nut and is released by being unlocked.

Advantageously, the holding sections of the holding member abut the inner cone wall over their entire surfaces. Thereby, in comparison with a partial abutment by the holding sections, an increased outer restrain is applied to the holding member, which insures a better formlocking fixation of the quick-mountable nut. With the abutment by the holding member over its entire surface, the holding member is so aligned, upon mounting or insertion of the threaded bolt, that a perfect engagement of the holding member with the threaded bolt is achieved. The possibility of tilting of the holding member within the nut housing is completely eliminated.

Advantageously, the holding sections of the holding member each has an annular middle portion located in a radial plane of the threaded bolt and partially engaging the threaded bolt along is screw thread. The circular middle portions form a thread that can engage in the screw thread of the threaded bolt. Preferably, the circular middle portion is formed by an offset extending radially inward. Preferably, the two arms of the holding member have each an inclination that corresponds to the inclination of the screw thread of the threaded bolt. Thereby, a reliable connection of the outer profile of the threaded bolt with the holding member is insured.

Advantageously, the holding member is axially displaced until it engages a stop which is provided in the nut housing and which limits the axial displacement of the holding member and insures locking of the quick-mountable nut in the nut housing. When the nut housing provides for displacement of the holding member in the setting direction of the nut or in the opposite direction, two stops can be provided for limiting displacement of the holding member in both directions. The two holding sections of the holding member, which are moveable relative to each other, are advantageously connected, in this case, with latching means that form a guide along the holding member embeddable in the nut housing.

Advantageously, the quick mountable nut has a cover for covering the nut housing, and has optionally a wedge supported on the cover and extendable radially inward. The wedge is inserted between free ends of the holding sections of the holding member for displacing the holding sections away from each other. The wedge forms unlocking means, that upon insertion between the ends of the holding sections, expands the holding sections against a biasing force. Thereby, the quick-mountable nut can be axially positioned, without being rotated. The wedge provides for both fixation of the quick-mountable nut and its release.

Advantageously, each of the holding sections of the holding member is provided with a cantilever arm extending along the holding member, with the cantilever arms being arranged opposite each other. The cover, e.g., can be provided with oppositely arranged support bolts which support sidewise respective cantilever axially springy arms. With actuation of at least one but, preferably, both cantilever arms, the axially locked holding member can be axially pulled out of the receiving opening, with the engagement between the holding member and the threaded bolt being released. Upon release of the cantilever arms, the holding member again engages the thread of the threaded advantageously, with an opening for actuation of the cantilever arms of the holding member.

Advantageously, the nut housing, the cover, and/or the holding member are formed of sheet metal by combined cutting and bending process. Separate parts can be made of suitable plastic material. To meet particular requirements, the elements of the quick-mountable nut can be formed of different materials. To insure a high reliability of attachment or when the quick-mountable nut is used in an aggressive atmosphere, at least the holding member is formed of stainless steel.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
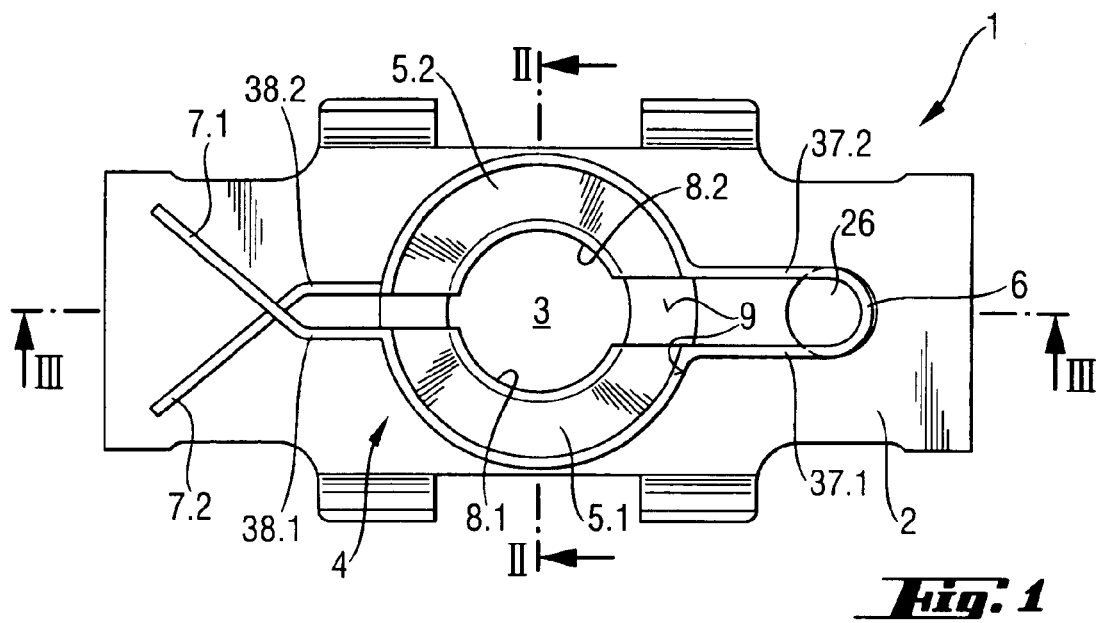
FIG. 1 a plan view of a nut housing of a first embodiment of a quick-mountable but according to the present invention.

A quick-mountable nut 1 according to the present invention, a first embodiment of which is shown in FIG. 1, has a nut housing 2 provided with a coaxial through-opening 3. The through-opening 3 has a tapering inner cone 9. A holding member 4 is received in the through-opening 3. The holding member 4 has two springy holding sections 5.1 and 5.2 inclined toward each other and connected with each other at one of their respective ends by a curve element 6. At their free ends, the holding sections 5.1 and 5.2 are provided with cantilever arms 7.1 and 7.2, respectively. The holding sections 5.1 and 5.2 form an outer cone substantially complementary to the inner cone 9 of the opening 3, with outer surfaces 10.1 and 10.2 of the holding sections 5.1 and 5.2 abutting respective surfaces of the inner cone 9.

When one of the cantilever arms 7.1 and 7.2 is operated upon or both of the cantilever arms 7.1 and 7.2 are simultaneously operated upon, the holding sections 5.1 and 5.2 expand with respect to each other, and the nut 0.1 can be axially displaced along a threaded rod 22. The nut 1 can be displaced along the threaded rod 22 even when the threaded rod 22 has burrs at its ends resulting from the cut. When the nut 1 engages the threaded rod 22, by operating the cantilever arms 7.1 and 7.2, the engagement of the holding sections 5.1 and 5.2 with the threaded rod 22 can be released, and the nut 1 can be displaced axially. When the cantilever arms 7.1 and 7.2 are released, the holding sections 5.1 and 5.2 would again engage the threaded rod 22. By rotating the quick mountable nut 1 and/or the threaded rod 22, the nut 1 would again be secured.

Figure 2:
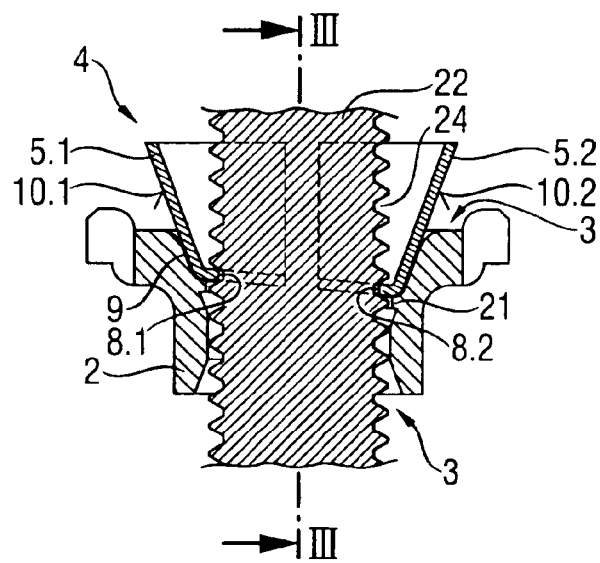
FIG. 2 a cross-sectional view along line II—II in FIG. 1.
Figure 3:
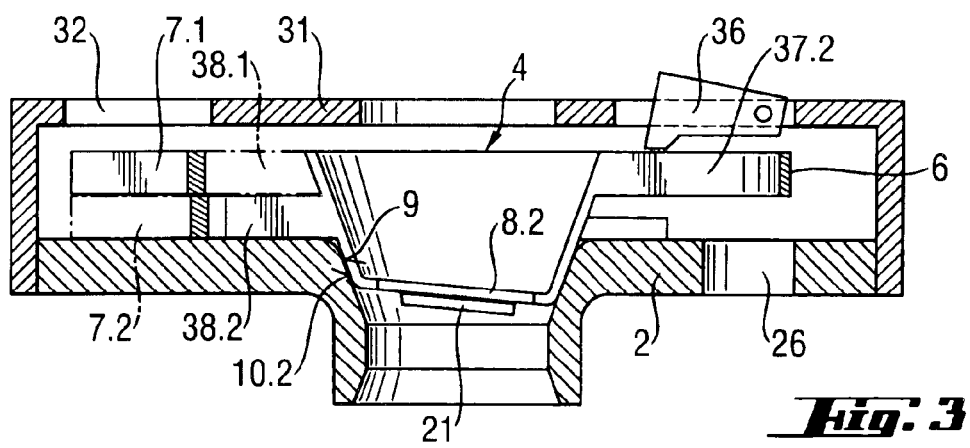
FIG. 3 a cross-sectional view along line III—III in FIGS. 1–2.

The holding sections 5.1 and 5.2 each has a circular middle portion 8.1 and 8.2 forming a radial offset extending radially inwardly and engaging in a groove 24 between threads of the threaded rod 22, providing for a perfect engagement along the threads. As shown in FIGS. 2 and 3, the opening 3 is provided with a positioning cam 21 extending radially along a portion of a circumference of the opening 3. The positioning cam 21 limits the axial displacement of the holding member 4 in the opening 3 in a setting direction of the quick-mountable nut 1.

As shown in FIG. 3, a further opening 26 is provided in the nut housing 2. The opening 26 is designed for receiving a guide pin that would prevent the holding member 4 from being displaced radially with respect to the setting direction of the nut in the region of the curve element 6 of the holding member 6.

The quick-mountable nut 1 can be additionally provided with a cover 31 connectable with the nut housing 2 and covering, at least partially, the holding member 4. For actuation of the cantilever arms 7.1 and 7.2 of the holding member 4, an opening 32 is formed in the cover 31.

Optionally, the cover 31 can cover the entire housing 2. In this case, a wedge 36 extendable radially inward is provided. Upon its actuation, the wedge 36 can extend into space between longitudinal sections 37.1 and 37.2 of the holding member 4, expanding the holding element 4. In this case also, the two, now superfluous, cantilever arms 7.1 and 7.2, which are arranged opposite each other, can be eliminated. At their ends opposite the curve element 6, the longitudinal sections 38.1 and 38.2 of the holding element 3 can be likewise be connected with curve element similar to the curve element 6.

Figure 4:
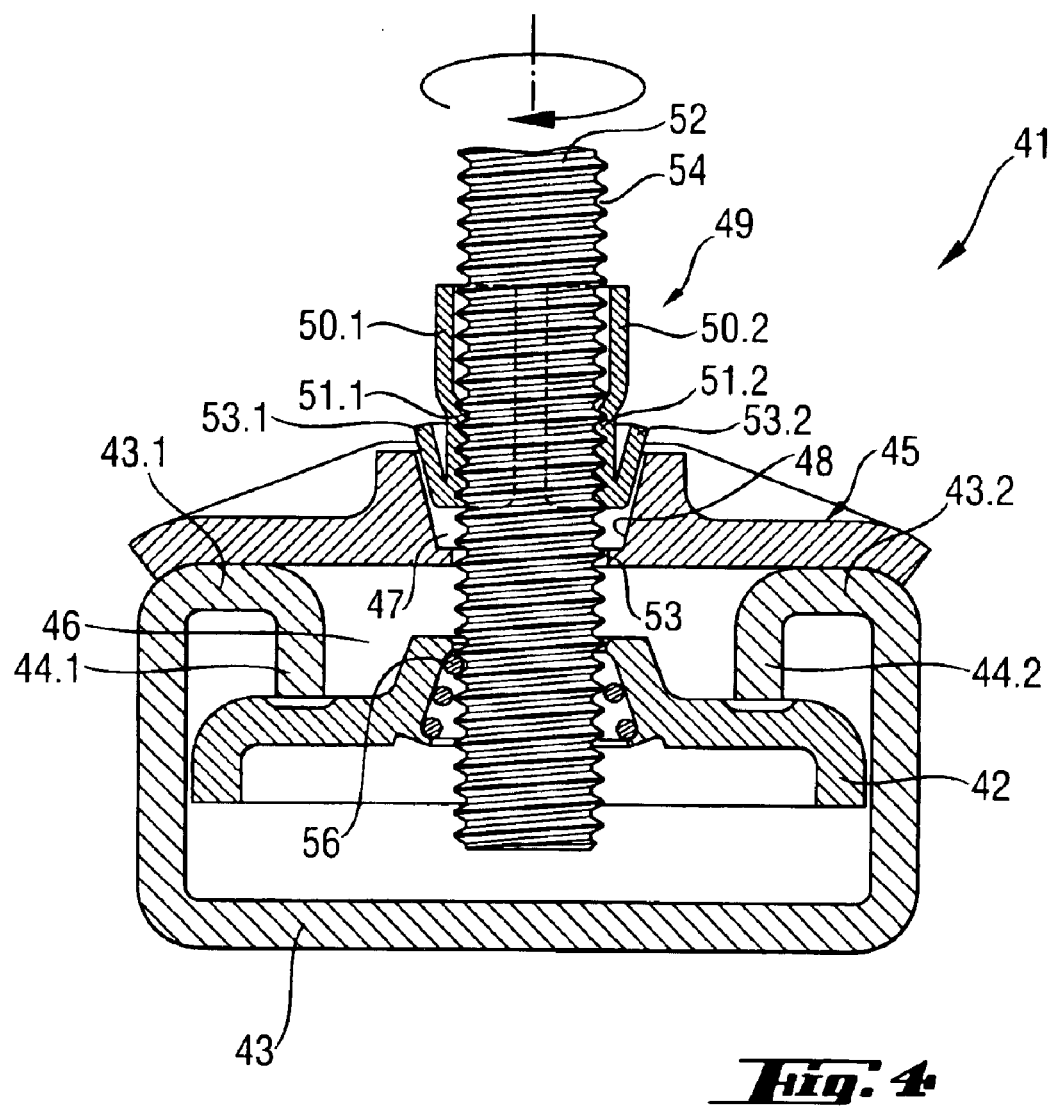
FIG. 4 a cross-sectional view of a second embodiment of a quick-mountable nut according to the present invention and formed as a rail nut.

FIG. 4 shows, as it has already been discussed in e section "Brief Description of the Drawings," a quick-mountable nut formed as rail nut 41. The rail nut 41 includes a rear engagement member 42 for engaging from behind holding projections 44.1 and 44.2 provided in a C-shaped mounting rail 43, and a nut housing 45 formed as a stop for engaging outer end surfaces of edges 43.1 and 43.2 of the mounting rail 43 which limit the opening 46 of the mounting rail 43. The nut housing 45 has an opening 47 coaxial with opening 46 and having an inner core 48 tapering radially inward. The rail nut 41 further includes a holding member 49 having two holding sections 50.1 and 50.2, forming parts of a cylinder. The holding sections 50.1 and 50.2 form together a receiving sleeve and are connected with each other in a manner similar to that the holding sections 5.1 and 5.2 of the holding member 4 on the nut 1 are connected. The holding sections 50.1 and 50.2 are provided with sections 51.1 and 51.2 having each an inner thread for receiving a threaded rod 52. At their ends facing in the setting direction of the rail nut 43, the holding sections 50.1 and 50.2 of the holding member 49 have each a fold-over 53.1, 53.2 which forms an even wall section abutting the surface of the inner cone 48 of the nut housing 45.

When, e.g., the threaded rod 52 is screwed in with its threads 54 into a thread 56 of the rear engagement member 42, the engagement member 42 is displaced, as a result of the threaded rod 52 being screwed in, so that it engages the holding projections 44.1 and 44.2 from behind. The nut housing 45 is displaced by the threaded rod 52 until it engages or abuts the free edges 43.1 and 43.2 of the mounting rail 43. Finally, the holding member 49 is expanded by the rotatable threaded rod 52. Thus, the rotation of the threaded rod 52 results in locking of the entire rail nut 41 on the mounting rail 43, with the rear engagement member 42 fixed by engaging the holding projections 44.1 and 44.2. Alternatively, the rail nut 41 can be locked on the mounting rail 43 by locking of the nut housing 45.

According to another embodiment of rail nut 41, the ear engagement member 42, the nut housing 45 with the holding member 49, an the threaded rod 52 are pre-assembled. After the rear engagement member 42 is inserted into the mounting rail 43 and is aligned for engaging the holding projections 44.1 and 44.2, the pre-positioned rail nut 41 is locked on the mounting rail 43 by rotation of the nut housing 45. The circumferential projection 53 provided the opening 47 limit the axial displacement of the holding member 49.

In summary, the inventive quick-mountable nut enables to formlockingly secure a threaded bolt, while insuring a high reliability of the connection and a high performance capability.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A quick-mountable nut capable of at least partially rotation-free, axial displacement relative to a threaded bolt (22; 52), comprising a nut housing (2; 45) having a central through-opening (3; 47); and a springy holding member (4; 49) at least partially located in the nut housing (2; 45) and engaging in at least one screw thread (24; 54), the central through-opening (3; 47) being formed as a tapering radially inward, inner cone (9; 48) for receiving the holding member (4; 49), and the holding member (4; 49) having two, resiliently movable relative to each other, holding sections (5.1, 5.2; 50.1, 50.2, each having a conical section of substantially uniform thickness (10.1, 10.2) abutting a wall of the inner cone (9, 48), along at least a portion of an axial extent of the inner cone (9,48), wherein the holding sections (5.1, 5.2) of the holding member (4) each have an annular middle portion (8.1, 8.2; 51.1, 51.2) located in a radial plane of the threaded bolt (22; 52) partially engaging along the screw threads (24; 54) of the threaded bolt (22; 52), and wherein the annular middle portion (8.1, 8.2) is formed by an offset extending radially inwardly of the conical section (10.1, 10.2).

2. A quick-mountable nut according to claim 1, wherein the holding sections (5.1, 5.2; 50.1, 50.2) of the holding member (4; 49) abut the wall of the inner cone (9; 48) over respective entire surfaces of the holding sections (5.1, 5.2; 50.1, 50.2).

3. A quick-mountable nut according to claim 1, wherein the nut housing (2, 45) has at least one stop (21; 53) for limiting an axial displacement of the holding member (4,49).

4. A quick-mountable nut capable of at least partially rotation-free, axial displacement relative to a threaded bolt (22; 52), comprising a nut housing (2; 45) having a central through-opening (3; 47); a springy holding member (4; 49) at least partially located in the nut housing (2; 45) and engaging in at least one screw thread (24; 54), the central through-opening (3; 47) being formed as a tapering radially inward, inner cone (9; 48) or receiving the holding member (4; 49), and the holding member (4; 49) having two, resiliently movable relative to each other, holding sections (5.1, 5.2; 50.1, 50.2) each having a conical section of substantially uniform thickness (10.1, 10.2) abutting a wall of the inner cone (9, 48) along at least a portion of an axial extent of the inner cone (9,48), the nut housing (2); and a wedge (36) supported on the cover (31) and extending radially inward and insertable between free ends (37.1, 37.2) of the holding sections (5.1, 5.2) of the holding member (4).

5. A quick-mountable nut capable of at least partially rotation-free, axial displacement relative to a threaded bolt (22; 52), comprising a nut housing (2; 45) having a central through-opening (3; 47); and a springy holding member (4; 49) at least partially located in the nut housing (2; 45) and engaging in at least one screw thread (24; 54), the central through-opening (3; 47) being formed as a tapering radially inward, inner cone (9; 48) for receiving the holding member (4; 49), and the holding member (4; 49) having two, resiliently movable relative to each other, holding sections (5.1, 5.2; 50.1, 50.2) each having a conical section of substantially uniform thickness (10.1, 10.2) abutting a wall of the inner cone (9, 48) along at least a portion of an axial extent of the inner cone (9,48), wherein the holding sections (5.1, 5.2) of the holding member (4) have each a cantilever arm (7.1, 7.2), the cantilever arms (7.1, 7.2) being arranged opposite each other.

6. A quick-mountable nut capable of at least partially rotation-free, axial displacement relative to a threaded bolt (22; 52), comprising a nut housing (2; 45) having a central through-opening (3; 47); and a springy holding member (4; 49) at least partially located in the nut housing (2; 45) and engaging in at least one screw thread (24; 54), the central through-opening (3; 47) being formed as a tapering radially inward, inner cone (9; 48) or receiving the holding member (4; 49), and the holding member (4; 49) having two, resiliently movable relative to each other, holding sections (5.1, 5.2; 50.1, 50.2) each having a conical section of substantially uniform thickness (10.1, 10.2) abutting a wall of the inner cone (9, 48) along at least a portion of an axial extent of the inner cone (9,48), wherein the holding member (4, 49) is formed of a sheet metal by a combined cutting and bending process.

* * * * *